(12) United States Patent
Liu et al.

(10) Patent No.: US 11,682,427 B2
(45) Date of Patent: *Jun. 20, 2023

(54) SYSTEM AND METHOD FOR MANAGING OFF-TRACK READ RETRY

(71) Applicant: Seagate Technology LLC, Fremont, CA (US)

(72) Inventors: Xiong Liu, Singapore (SG); Quan Li, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,047

(22) Filed: Mar. 1, 2022

(65) Prior Publication Data
US 2022/0366937 A1 Nov. 17, 2022

Related U.S. Application Data

(63) Continuation of application No. 17/086,003, filed on Oct. 30, 2020, now Pat. No. 11,295,777.

(51) Int. Cl.
*G11B 5/09* (2006.01)
*G11B 20/10* (2006.01)

(52) U.S. Cl.
CPC .. *G11B 20/10388* (2013.01); *G11B 20/10037* (2013.01)

(58) Field of Classification Search
None
See application file for complete search history.

(56) References Cited

U.S. PATENT DOCUMENTS

| 6,061,201 | A | * | 5/2000 | Woods | G11B 5/59633 360/77.06 |
|---|---|---|---|---|---|
| 9,007,707 | B1 | * | 4/2015 | Lu | G11B 5/022 360/39 |
| 9,286,915 | B1 | * | 3/2016 | Dziak | G11B 5/012 |
| 11,295,777 | B1 | * | 4/2022 | Liu | G11B 20/10037 |
| 2002/0176189 | A1 | * | 11/2002 | Cyrusian | G11B 5/012 |
| 2003/0137765 | A1 | * | 7/2003 | Yamazaki | G11B 5/09 |
| 2003/0147168 | A1 | * | 8/2003 | Galbraith | G11B 20/10009 360/53 |
| 2007/0273999 | A1 | * | 11/2007 | Utsumi | G11B 5/59627 360/75 |
| 2014/0029133 | A1 | * | 1/2014 | Tagami | G11B 21/106 360/75 |
| 2014/0156663 | A1 | | 6/2014 | Rhyu et al. | |
| 2014/0268387 | A1 | | 9/2014 | Park et al. | |
| 2020/0126587 | A1 | | 4/2020 | Kilbey et al. | |

* cited by examiner

*Primary Examiner* — Peter Vincent Agustin
(74) *Attorney, Agent, or Firm* — Holzer Patel Drennan

(57) ABSTRACT

The technology disclosed herein pertains to a system and method for managing off-track retry. An implementation of a method of determining offset direction for read off-track retry includes storing analog to digital converter (ADC) values of data read from a data sector by a data reader in a read channel buffer, calculating an indicator value of the distribution of the ADC values, determining an amount of offset for the data reader based on the indicator value, and moving the data reader by the amount of offset before performing a read retry operation.

20 Claims, 5 Drawing Sheets

SYSTEM AND METHOD FOR MANAGING OFF-TRACK READ RETRY

CROSS-REFERENCE TO RELATED APPLICATIONS

This application is a Continuation of pending patent application Ser. No. 17/086,003 which was filed on Oct. 30, 2020, entitled System and Method for Managing Off-Track Read Retry. The disclosure set forth in the referenced application is incorporated herein by reference in its entirety.

BACKGROUND

Modern disc drives typically include one or more discs that are coated with a magnetizable medium and mounted on a hub of a spindle motor for rotation at a constant high speed. Information is written to and read from nominally circular, concentric data tracks on the discs through the use of a read/write head mounted to a movable actuator assembly positioned adjacent the discs. The actuator assembly typically includes a plurality of actuator arms that extend over the discs, with one or more flexures extending from each of the actuator arms. Mounted at the distal end of each of the flexures is the read/write head, including a write transducer for writing information to the tracks and a read transducer for reading information from the tracks when the read write head is positioned over the desired track.

To ensure reliable storage and retrieval operations by the disc drive, the user data is typically encoded with an error correction codes (ECC) before being written to the disc. The ECC is used to detect and correct up to a selected number of errors in the retrieved sequence of data. Occasionally a disc drive will read erroneous data from a data sector that cannot be corrected by the ECC. These type of uncorrectable errors (read errors) are typically detected by an error correction code circuit (ECC) in the disc drive, which may perform both error detection and error correction upon the data read from the data sectors (using, for example Reed-Solomon codes). If no uncorrectable errors are present, the read data is output to the user. However, if the ECC circuit is not able to correct the error(s), a read error is declared, and appropriate remedial actions are undertaken.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for managing off-track retry. An implementation of a method of determining offset direction for read off-track retry includes storing analog to digital converter (ADC) values of data read from a data sector by a data reader in a read channel buffer, calculating an indicator value of the distribution of the ADC values, determining an amount of offset for the data reader based on the indicator value, and moving the data reader by the amount of offset before performing a read retry operation.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

When a read error occurs during a read operation in a disc drive, a number of different read error recovery techniques may be employed to correct the error. For example, in a simplest case, after a read error has occurred with respect to a data sector, the read transducer is maintained at its current location and the data sector is simply read again the next time the data sector rotates beneath the read transducer. That is, a read retry operation is performed with respect to the data sector. Another technique that may be employed involves performing a read retry operation while adjusting various read processing parameters. Yet another technique that may be employed involves moving the transducer a slight distance from its current location (performing an offset operation) and then performing a read retry operation. Performing track offset and retry operations together is a particularly useful technique in cases where the data associated with the erroneous read operation has been inadvertently written off-track and erased by writing the adjacent track.

There are a number of drawbacks associated with this offset/read retry process. First, sweeping the read transducer back and forth across the track center to perform the read retry operation in this manner can result in unwanted resonance in the mechanical components of the disc drive. The mechanical resonance may induce noise into the servo positioning system, thus making it increasingly difficult to position the read transducer accurately. Additionally, the mechanical resonance may cause undesirable audible vibrations to occur in the disc drive. Secondly, since a full rotation of the disc must occur for each retry operation, a significant amount of rotational latency may be incurred if a successful read retry operation is not achieved early in the retry process.

The technology disclosed herein pertains to a system and method for managing off-track retry. An implementation of a method of determining offset direction for read off-track retry includes storing analog to digital converter (ADC) values of data read from a data sector by a data reader in a read channel buffer, calculating an indicator value from the distribution of the ADC values, determining an amount of offset for the data reader based on the indicator value, and moving the data reader by the amount of offset before performing a read retry operation.

Figure 1:
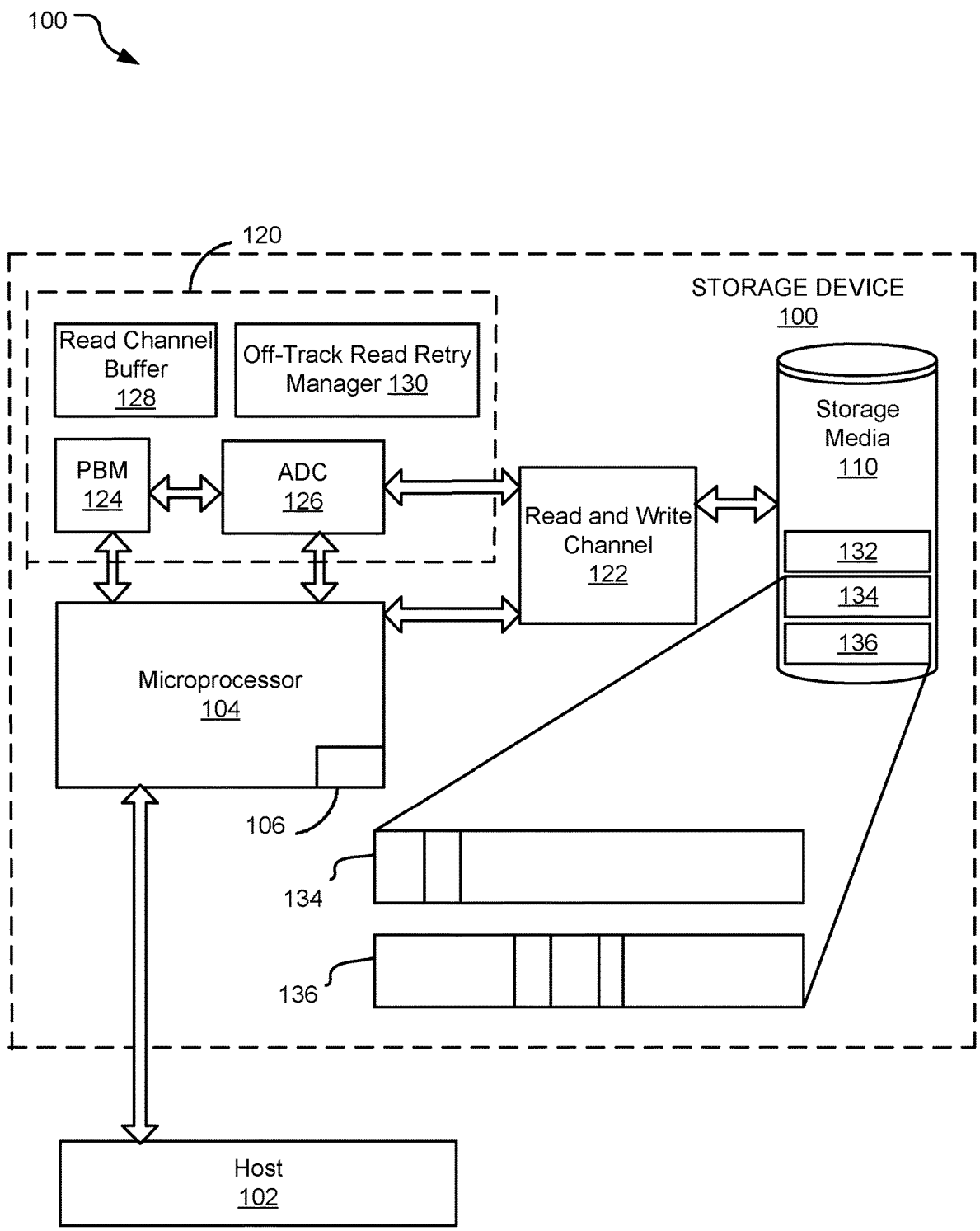
FIG. 1 illustrates an example block diagram of a system for managing off-track read retries in a disc drive.

FIG. 1 illustrates a functional block diagram of a storage device 100 for managing off-track read retries in a disc drive. Specifically, FIG. 1 shows one or more functional circuits that are resident on a disc drive printed circuit board used to control the operation of the disc drive. The storage device 100 is operably and communicatively connected to a host computer 102. Control communication paths are provided between the host computer 102 and a disc drive microprocessor 104, the microprocessor 104 generally providing top-level communication and control for the storage device 100 in conjunction with programming for the microprocessor 104 stored in microprocessor memory (MEM) 106. The MEM 106 can include random access memory (RAM), read only memory (ROM) and other sources of resident memory for the microprocessor 104. Storage device 100 stores data on a storage media 110 such as magnetic discs, optical discs, etc. In one implementation, the storage media 110 may store data in various sectors 132, 134, 136, etc. Each of the sectors 132, 134, 136 may be mapped to logical block addresses (LBAs) that are managed by the interface 120.

Communication paths are provided between the host computer 102 and the storage media 110 via an interface 120 and a number of read/write channels 122 (referred to hereinafter as read channel 122 or as write channel 122). The interface 120 includes a disc drive platform buffer manager (PBM) 124, a read channel buffer 128 and an analog to digital converter (ADC) 126. Data is transferred between the host computer 102 or other device and the storage device 100 by way of the interface 120. The read channel buffer 128 facilitates high-speed data transfer between the host computer 102 or other device and the storage device 100. Data to be written to the storage device 100 is thus passed from the host computer 102 to the interface 120 and then to the write channel 122, which encodes and serializes the data into data symbols and provides the requisite write current signals to the heads of the storage media 110.

To retrieve data that has been previously stored in the storage media 110, read signals are generated by the heads of the storage media 110 and provided to the read channel 122. The output from the read channel 122 is provided to the ADC 126 of the interface 120. The ADC 126 converts the read output into digital data. In one implementation, the ADC 126 may convert the read signals into digital signals with a resolution of 6 bits, that is each analog read signal is converted into a 6-bit digital signal, giving it a value between −32 and 31 (total possible 64 values).

The digital values from the ADC for each sector 132, 134, 136, are saved in the read channel buffer 128 by sector. In one implementation of the storage device 100, the interface 120 also includes an off-track read retry manager (OTRR) 130 that analyzes the digital read values stored in the read channel buffer 128 by sector. For example, in one implementation, the OTRR 130 counts the total number, or cumulative distribution function (CDF), $t_0$ of read outputs for a given sector where the ADC of the read value is between −32 and −22 with the data reader located on center of track for that sector. Subsequently, the OTRR 130 may count the total number, or CDF, $t_1$ of read outputs for a given sector where the read value is between −32 and −22 with the data reader located 4% track pitch (TP) off-track to the left of the center of track for that sector. Subsequently, the OTRR 130 may compare the CDF $t_0$ with the CDF $t_1$. Note that in this implementation, the values of CDFs $t_0$ and $t_1$, are determined for ADC values of −32 to −22, in alternative implementation, other values of ADC may be used to calculate CDFs $t_0$ and $t_1$. For example, in one alternative implementation, the ADC values between −32 and −24 may be used to calculate the CDFs $t_0$ and $t_1$. These operations may be necessary when a read is unsuccessful, and it is necessary to perform an offset read retry. Furthermore, the off-track read retries may end when a successful read is performed at any given offset. Furthermore, the off-track read retries may also end, whether successful or not, if the count of retries (number of offsets) is greater than a predetermined count, such as for example, 20.

If the $t_0 > t_1$, then the OTRR 130 instructs the microprocessor 104 to continue moving the reader additionally to the left. For example, in this case, the reader may be moved to a position 8% off-track to the left of the center of track for that sector. Subsequently, new values of CDFs $t_0$ and $t_1$ are calculated with to being the CDF at 4% TP offset and $t_1$ being the CDF at 8% offset. Again, the revised values of the CDFs $t_0$ and $t_1$ are compared and if $t_0 > t_1$, the reader may be moved further left away from the center.

On the other hand, if during any comparison $t_0 > t_1$, then the microprocessor 104 instructs the reader to be moved to right of its current location. Thus, if the reader was at the center of the data track and if the OTRR 130 determines that $t_0 > t_1$, than the reader is moved 4% TP to the right of the center of the date track.

In one implementation, if during any of these comparison of the CDFs $t_0$ and $t_1$, if it is determined that CDFs $t_0$ and $t_1$ are substantially close to each other, the best offset to read the data may be at the center of the two reader locations where the CDFs $t_0$ and $t_1$ are determined. In that case, the reader is moved to the average of the two locations and the off-track recovery process is completed. In one implementation, if the recovery is not achieved at the location that is the average of the two locations, than the OTRR 130 may change the TP offset step to 0.5% from 4% and repeat the comparison of the CDFs $t_0$ and $t_1$.

Figure 2:
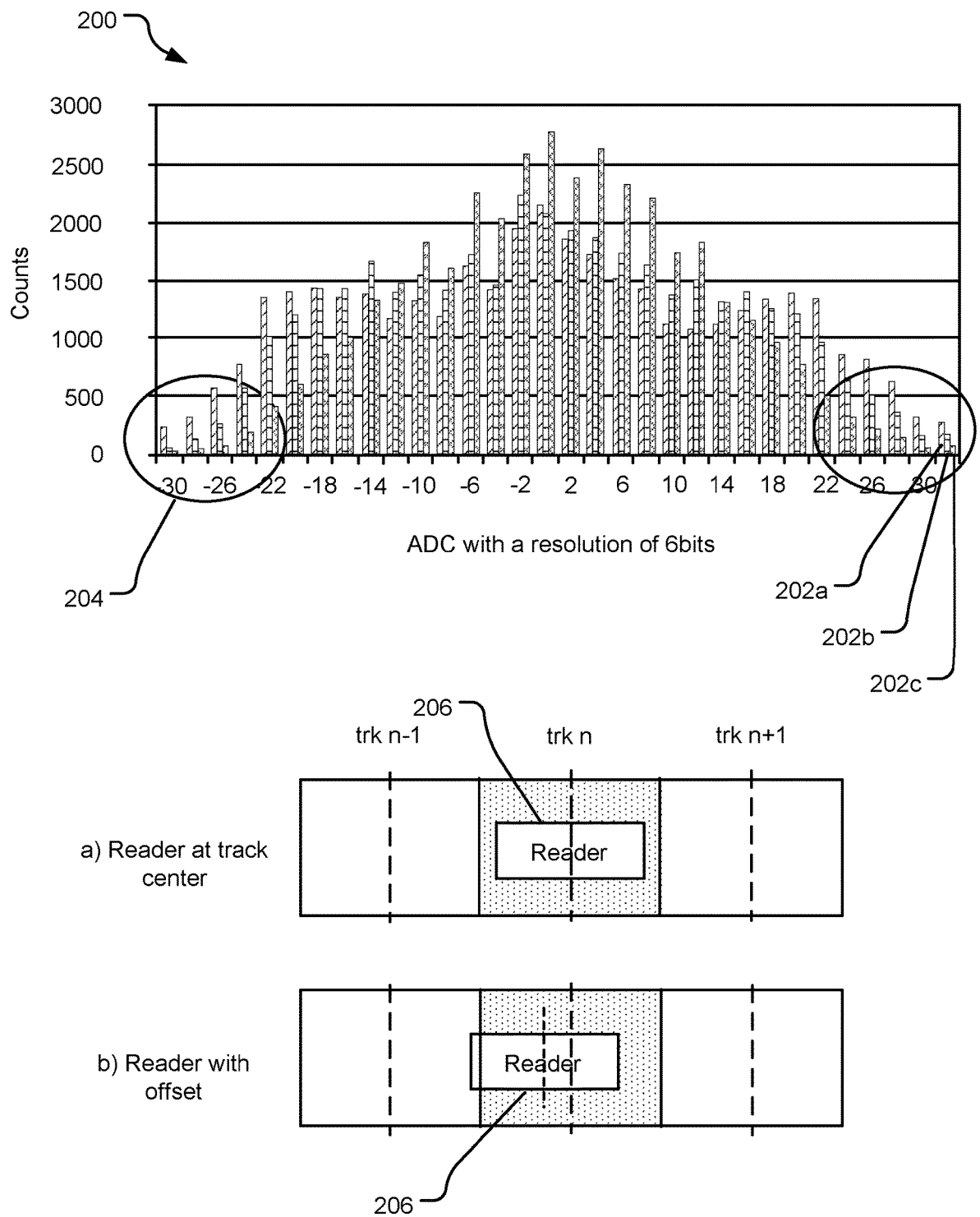
FIG. 2 illustrates an example distribution graph of distribution of ADC data counts for various positions of a reader on a data track.
Figure 3:
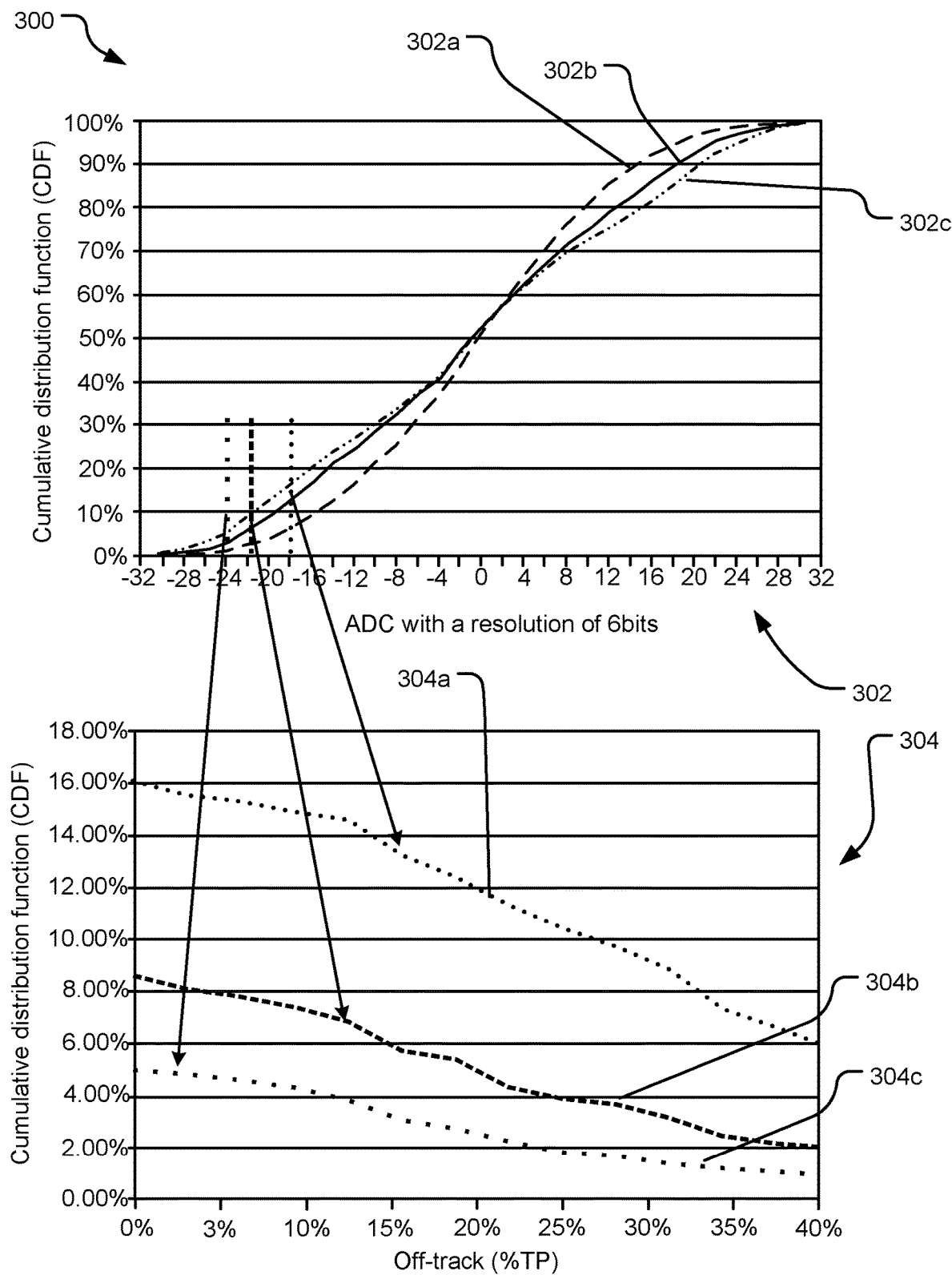
FIG. 3 illustrates an example cumulative distribution function (CDF) graph of cumulative distribution of ADC data counts for various positions of a reader on a data track.

FIGS. 2 and 3 disclosed herein demonstrates that if the reader reads back at the right offset, the ADC (such as the ADC 126 of FIG. 1) generates a relatively large count of ADC values on two sides from the range of −32 to −22 and from the range of 22 to 31. FIG. 2 illustrates an example distribution graph 200 of distribution of ADC data counts for various positions of a reader on a data track. Specifically, the graph 200 illustrates ADC counts 202 for various ADC values for three different reader positions. For example, 202a is a count of ADC value equal to 31 for a reader 206 being 0% TP off-track, or at the center of the track. Similarly, 202b is a count of ADC value equal to 31 for reader 206 being 19% TP off-track and 202b is a count of ADC value equal to 31 for reader 206 being 41% TP off-track.

As shown, the propose to use distribution graph 200 of ADC values in a buffer as an indicator to determine the offset direction to accelerate the search of best track offset and minimize the off-track retry time consumption. Thus, as shown in FIG. 2, when reader 206 is at the track center, the data signal is strong, there are more data at two sides in distribution graph 200 as shown in FIG. 2. On the other hand, when reader 206 has track offset, the data signal become weak due to randomly mixing of two tracks signal, there are less data at two sides in the distribution graph as shown in FIG. 2. For the distribution graph 200, the sum of the ADC count from ADC values being from −32 to −22, gives value oft 204 for given reader offset. Thus, the value 204 may be $t_0$, $t_1$, etc., for determining the next position of the reader 206.

FIG. 3 illustrates an example cumulative distribution function (CDF) graphs 300 of cumulative distribution of ADC data counts for various positions of a reader on a data track. Specifically, a graph 302 illustrates various CDFs for various reader offset from a track center. Specifically, 302a illustrates CDF of ADC data counts for track offset of 41% TP, 302b illustrates CDF of ADC data counts for track offset of 19% TP, and 302c illustrates CDF of ADC data counts for track offset of 0% TP.

The graph 304 illustrates the change in CDF at various percentages TP offset positions from −32 ADC. Specifically, 304a illustrates the change in CDF from −32 to −24, 304b illustrates the change in CDF from −32 to −22, and 304c illustrates the change in CDF from −32 to −22. In one implementation, the CDF change from −32 to −22 as illustrated by 304c is used to determine recommended reader offset position.

Figure 4:
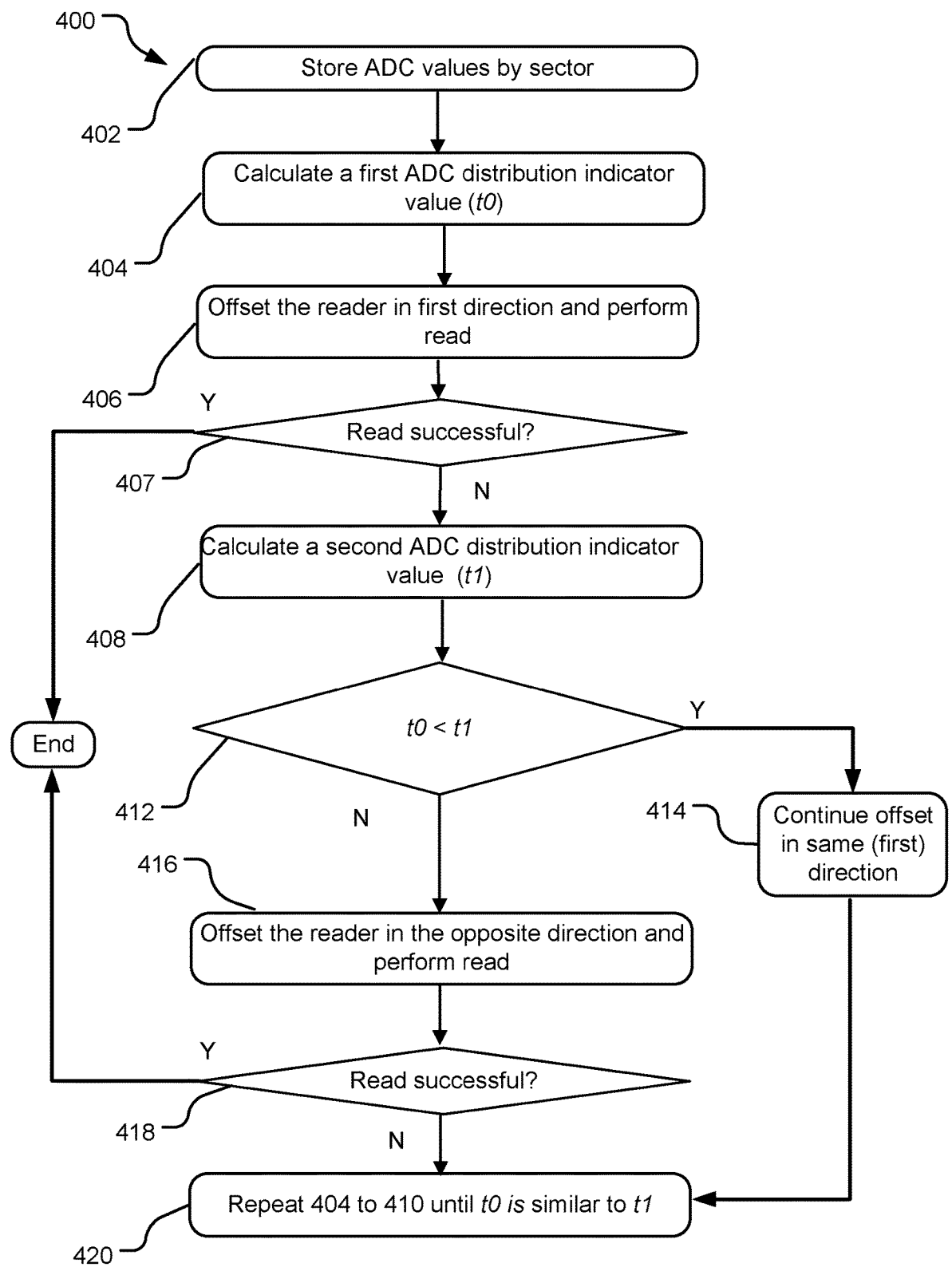
FIG. 4 illustrates example operations for managing off-track read retries in a disc drive.

FIG. 4 illustrates example operations 400 for managing off-track read retries in a disc drive. An operation 402 stores ADC values of data from a read channel by sector. An operation 404 calculates a first ADC distribution indicator value $t_0$. For example, such first ADC distribution indicator value $t_0$ may be a CDF of the ADC values from an ADC value of −32 to an ADC value of 022. An operation 406 offsets the reader in a first direction, such as to the left of the center of the data track and performs a read operation. An operation 407 determines if the read operation was successful. If so, the process ends, otherwise, an operation 408 calculates a second ADC distribution indicator value $t_1$. An operation 412 compares the first ADC distribution indicator value to with the second ADC distribution indicator value $t_1$.

If the $t_0 < t_1$ then an operation 414 continues to further offset the reader in the same direction as at operation 406. On the other hand, if $t_0 > t_1$, then an operation 416 offsets the reader in the opposite direction to that at operation 406 and performs a read operation. An operation 418 determines if the read operation was successful. If so, the process ends, otherwise, at operation 420, the operations 404 to 410 until $t_0$ and $t_1$ are substantially similar. Furthermore, the off-track read retries may also end, whether successful or not, if the count of retries (number of offsets) is greater than a predetermined count, such as for example, 20.

Figure 5:
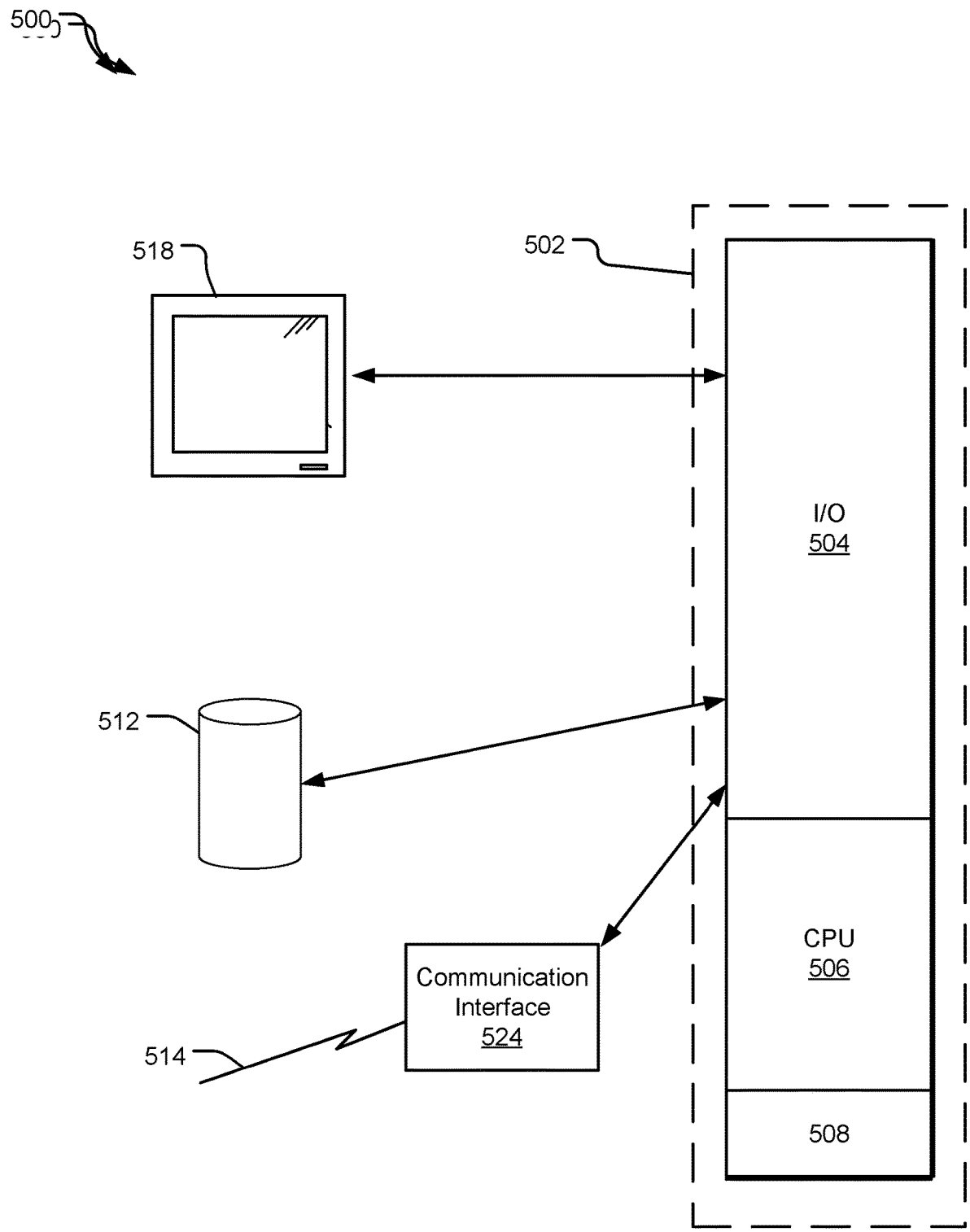
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of determining offset direction for read off-track retry, the method comprising:
   calculating an indicator value of distribution of analog to digital converter (ADC) values of data read from a data sector by a data reader; and
   moving the data reader by an amount of offset before performing a read retry operation, wherein the amount of offset for the data reader is determined based on the indictor value.

2. The method of claim 1, wherein determining the indicator value further comprising:
   calculating a first cumulative distribution function (CDF) value of data values at a lower ADC value;
   calculating a second CDF value of data values at a predetermined mid ADC value;
   determining a first delta between the first CDF value and the second CDF value as the indicator value.

3. The method of claim 2, wherein the ADC values are generated by a six-bit ADC and the lower ADC value is −32 bit.

4. The method of claim 3, wherein the mid ADC value is −22.

5. The method of claim 2, further comprising:
   offsetting the data reader by a predetermined percentage track pitch (TP) to left;
   determining a second delta between the first CDF value and the second CDF value; and
   in response to determining that the first delta is less than the second delta:
   substituting the second delta for the first delta, and
   further offsetting the data reader by the predetermined percentage track pitch (TP) to left.

6. The method of claim 5, further comprising:
   in response to determining that the first delta is greater than the second delta:
   substituting the second delta for the first delta, and
   further offsetting the data reader by the predetermined percentage TP to right.

7. The method of claim 5, wherein the first predetermined percentage TP is substantially four (4) percent.

8. The method of claim 5, further comprising:
   in response to determining that the first delta is substantially similar to the second delta reducing the value of the predetermined percentage TP.

9. A storage device, comprising:
   a data reader to read data to various sectors of the storage device;
   an analog to digital converter (ADC) to convert the read data into digital values; and
   an off-track read retry manager configured to store one or more computer readable instructions for executing on a computer system a computer process, the computer process comprising:
   calculating an indicator value of distribution of analog to digital converter (ADC) values of data read from a data sector by a data reader;
   determining an amount of offset for the data reader based on the indicator value; and
   moving the data reader by the amount of offset before performing a read retry operation.

10. The storage device of claim 9, wherein determining the indicator value further comprising:
    calculating a first cumulative distribution function (CDF) value of data values at a lower ADC value;
    calculating a second CDF value of data values at a predetermined mid ADC value;
    determining a first delta between the first CDF value and the second CDF value as the indicator value.

11. The storage device of claim 10, wherein the ADC values are generated by a six-bit ADC and the lower ADC value is −32 bit and wherein the mid ADC value is −22.

12. The storage device of claim 11, further comprising:
    offsetting the data reader by a predetermined percentage track pitch (TP) to left;
    determining a second delta between the first CDF value and the second CDF value; and
    in response to determining that the first delta is less than the second delta:

substituting the second delta for the first delta, and
further offsetting the data reader by the predetermined percentage track pitch (TP) to left.

13. The storage device of claim 12, further comprising:
in response to determining that the first delta is greater than the second delta:
substituting the second delta for the first delta, and
further offsetting the data reader by the predetermined percentage TP to right.

14. The storage device of claim 12, wherein the first predetermined percentage TP is substantially four (4) percent.

15. The storage device of claim 12, further comprising:
in response to determining that the first delta is substantially similar to the second delta reducing the value of the predetermined percentage TP.

16. One or more processor-readable non-transitory storage media encoding processor-executable instructions for executing on a computer system a computer process, the computer process comprising:
calculating an indicator value of distribution of analog to digital converter (ADC) values of data read from a data sector by a data reader;
determining an amount of offset for the data reader based on the indicator value; and
moving the data reader by the amount of offset before performing a read retry operation.

17. The one or more processor-readable non-transitory storage media of claim 16, wherein determining the indicator value further comprising:
calculating a first cumulative distribution function (CDF) value of data values at a lower ADC value;
calculating a second CDF value of data values at a predetermined mid ADC value;
determining a first delta between the first CDF value and the second CDF value as the indicator value.

18. The one or more processor-readable non-transitory storage media of claim 17, wherein the ADC values are generated by a six-bit ADC and the lower ADC value is −32 bit and wherein the mid ADC value is −22.

19. The one or more processor-readable non-transitory storage media of claim 18, wherein the computer process further comprising:
offsetting the data reader by a predetermined percentage track pitch (TP) to left;
determining a second delta between the first CDF value and the second CDF value; and
in response to determining that the first delta is less than the second delta:
substituting the second delta for the first delta, and
further offsetting the data reader by the predetermined percentage track pitch (TP) to left.

20. The one or more processor-readable non-transitory storage media of claim 19, wherein the computer process further comprising:
in response to determining that the first delta is greater than the second delta:
substituting the second delta for the first delta, and
further offsetting the data reader by the predetermined percentage TP to right.

* * * * *